Dec. 29, 1931.  H. C. DRAKE  1,838,084
FOLLOW-UP SYSTEM
Filed Sept. 11, 1926
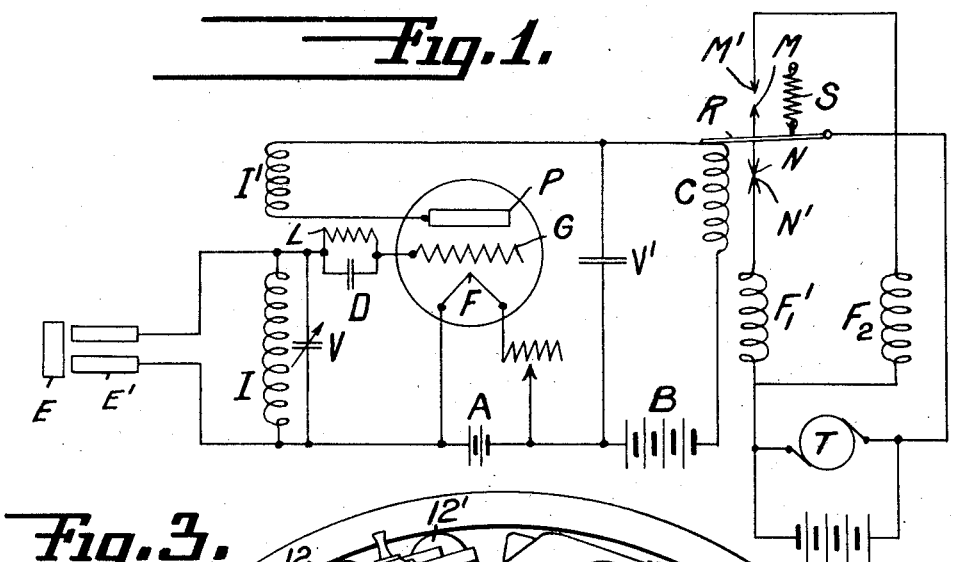
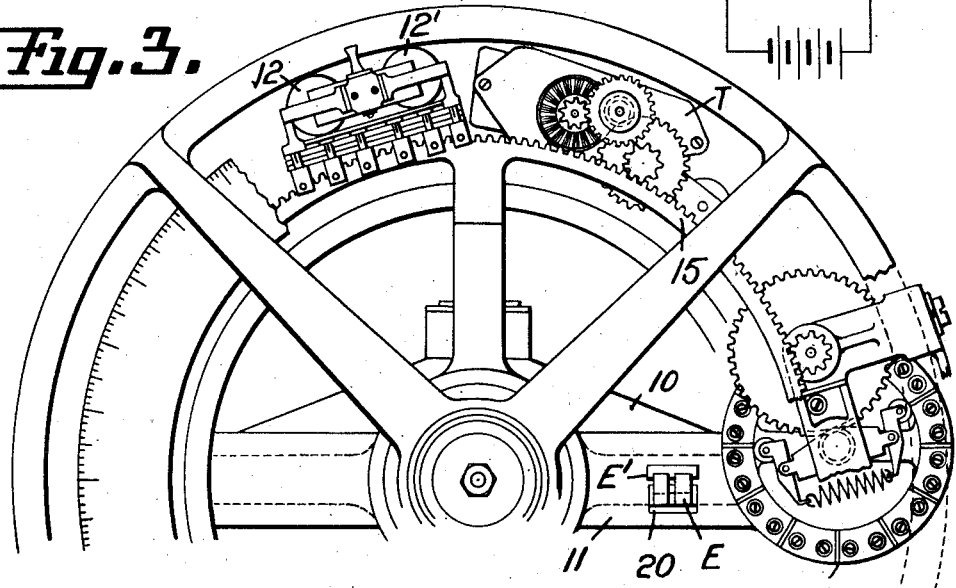
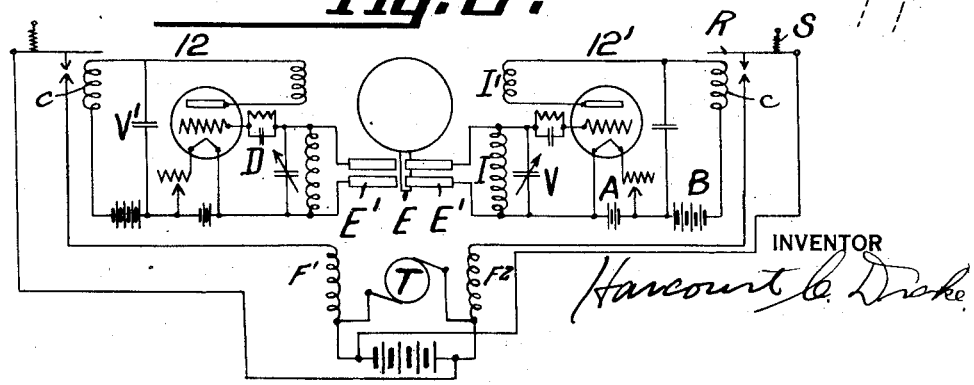
INVENTOR
Harcourt C. Drake Patented Dec. 29, 1931

1,838,084

UNITED STATES PATENT OFFICE

HARCOURT C. DRAKE, OF HEMPSTEAD, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

FOLLOW-UP SYSTEM

Application filed September 11, 1926. Serial No. 134,932.

This invention relates to follow-up systems and devices. Said systems comprise usually a sensitive element whose movements are designed to be duplicated or followed by the follow-up or phantom element. In so following the sensitive element the follow-up element is usually called upon to perform work which the sensitive element could not perform without placing too great a load upon it. It is desirable in such systems, therefore, to place as little load as possible upon the sensitive element. It is the principal object of my invention to provide a follow-up system wherein the follow-up element is entirely disconnected from the sensitive element so as to place no load whatever upon the said elements due to any mechanical connection or contact arrangement. For actuating the motive means which drives the follow-up element, I propose to employ between the sensitive and follow-up elements a frictionless, non-contacting, non-torque applying or mere influence linkage in an electrical circuit, preferably of the oscillatory or radio circuit type, in which relative movement between the sensitive and follow-up elements varies the reactance of the circuit, preferably the capacitive reactance, in such a manner that the motive means is actuated thereby in the proper direction to cause the follow-up system to follow the sensitive elements in either direction. For this purpose I may utilize a system of electrostatic balance between the two members or parts in said circuit.

Other objects and advantages of this invention will become clear in the following detailed description thereof.

In the accompanying drawings

Fig. 1 is a diagrammatic view of one form of my invention.

Fig. 2 is a diagrammatic view of a second form of my invention.

Fig. 3 is a plan view with parts broken away of the Fig. 2 form of my invention applied to a gyroscopic compass.

Referring to Fig. 1 there is disclosed one form of my invention embodying a follow-up system. My invention as shown in this figure may comprise a sensitive element and a follow-up element (not shown in Fig. 1 but which will be pointed out in connection with Fig. 3), the sensitive elements carrying one member E of the aforesaid influence linkage, which, in this instance, comprises one or more plates of a condenser, while the follow-up element carries the other plate or plates E' of the condenser. The two members are adapted to occupy a certain normal relative position when there is no movement between the sensitive element and the follow-up element. When, however, movement occurs between said elements, member E' is adapted to move toward or away from member E to vary the reactance of the circuit thereby disturbing the tuning and upsetting the electrostatic balance, the resultant unbalance being adapted to energize an actuating means for actuating the follow-up element to cause said element to follow the movements of the sensitive element as explained hereinafter.

For this purpose I may utilize any suitable wireless receiving circuit as shown in Fig. 1 adapted to be controlled by the condenser members E—E', and which in turn controls a servo motor T for actuating the follow-up element carrying member E'. The said wireless receiving circuit may comprise the usual audion tube consisting of plate P, grid G, and filament F, the inductance I in the grid circuit, inductance I' in the plate circuit, the source of filament current, battery A, the source of plate current, battery B, a variable condenser V, a by-pass grid condenser D, and a grid leak L. This will be recognized as typifying the conventional wireless receiving circuit in which I place a coil C, with which is adapted to cooperate an armature R carrying a set of contacts N—M adapted to cooperate with contacts N'—M' respectively to control the energization of two field coils $F_1$—$F_2$ of the motor T, to control the direction of operation of running of said motor depending upon which of said fields $F_1$—$F_2$ is energized. In this construction I have shown a hunting system, that is, one in which the motor T is continuously operating in one direction or the other to operate the follow-up element and condenser member E' in one direction or the other continuously so that there is no neutral or rest position. For this purpose I provide the spring S connected to the armature R so as to tend to close contacts M—M' and cause motor T to run in one direction.

It is only when the current in coil C becomes great enough to overcome the tension of spring S that armature R will be attracted by said coil to close contacts N—N' and cause the motor T to operate in the opposite direction and thus actuate the follow-up element and condenser member E' in the opposite direction. When said condenser member has overrun its neutral position then the armature R will be released by coil C to close contacts M—M' as before. The current through coil C is controlled by the condenser members E—E' as follows: The circuit through the wireless receiving system may be normally either oscillatory or non-oscillatory. I prefer to have the system tuned so that it is non-oscillatory normally, which means that the current in coil C will be high so that armature R will be normally attracted by said coil against the action of spring S. This will cause the contacts N—N' normally to engage and close the circuit through motor T in one direction. As soon, however, as the electrostatic balance between the members E—E' is destroyed by said members changing their relative positions, the circuit will be rendered oscillatory thus altering the charge on grid G thereby reducing the current through coil C and permitting the release of armature R and hence the energization of motor T in the opposite direction.

Where a hunting system is not desired, that is to say, where it is desired to have a neutral or rest position so that no movement of the follow-up element occurs when the proper electrostatic balance is established, it is necessary to have a compound relay system comprising essentially two wireless receiving circuits of the type shown in Fig. 1 with the condenser member E operating between two condenser members E' symmetrically disposed with respect to said member E. (See Fig. 2.) The relative movement of the sensitive element with respect to the follow-up element will energize the right or left hand wireless circuit in Fig. 2 to operate the motor T in one direction or the other, but as soon as the follow-up element has caught up with the sensitive element and the electrostatic balance between members E—E' is again established then the circuit through motor T is broken and all the parts remain at rest.

In Fig. 3, I have disclosed one application of my invention although the said invention is broadly capable of application wherever a follow-up system of this type is desired, that is, one wherein no load is preferably placed on the sensitive element. In said Fig. 3 will be recognized the usual elements of a gyroscopic compass showing the sensitive element 10 which carries member E extending through an opening 20 in the follow-up element 11 carrying the members E', the form of follow-up system shown here being that of Fig. 2, that is, the non-hunting system. The double relay 12, 12' is also disclosed and the other elements being the usual azimuth motor T which drives the follow-up element through the azimuth gear 15 geared to said motor and which carries said follow-up element 11. The said motor may also operate the usual transmitter 16 through said azimuth gear for actuating repeater elements. It will be seen that there is no physical engagement between the follow-up element and the sensitive element and that, therefore, substantially no load is placed upon the sensitive element which is highly desirable particularly in this type of instrument.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a follow-up system for gyro compasses including a sensitive element and a follow-up element, a pair of cooperating members on said elements respectively, so mounted that relative movement between said elements varies the reactance of said members, and means controlled by the variable reactance of said members for actuating said follow-up element in a direction to follow said sensitive element.

2. In a follow-up system for gyro compasses including a sensitive element and a follow-up element, a condenser, means whereby relative movement between said elements varies the capacity of said condenser, and means controlled by the capacity of said condenser for actuating said follow-up element to cause said element to follow the sensitive element in either direction.

3. In a follow-up system for gyro compasses including a sensitive element and a follow-up element, a normally non-oscillatory wireless receiving circuit including a condenser comprising members carried by the sensitive element and the follow-up element respectively, means whereby relative movement between said elements varies the capacity of said condenser to render said circuit oscillatory, and means whereby said follow-up element is actuated when said circuit is rendered oscillatory.

4. In a follow-up system including a sensitive element and a follow-up element, a plurality of wireless receiving circuits, means whereby movement of said sensitive element relative to said follow-up element in one direction varies the flow of current in one of said circuits and movement in the other direction varies the flow of current in another of said circuits, and means whereby variations of current flow in said circuits actuate said follow-up element in the respective directions to follow the sensitive element.

5. In a follow-up system including a sensitive element and a follow-up element, a pair of electrostatically balanced systems, means whereby movement of said sensitive element relative to said follow-up element in one direction destroys the balance in one of said systems and movement in the other direction destroys the balance in the other of said systems, and means whereby said follow-up element is actuated in the respective direction to follow the sensitive element when the balance in the respective systems is destroyed.

6. In a follow-up system including a sensitive element and a follow-up element, a plurality of wireless receiving circuits, each of said circuits including a condenser, the members of said condenser being carried by said sensitive element and said follow-up element respectively, means whereby movement of said sensitive element relative to said follow-up element in one direction varies the flow of current in one of said circuits and movement in the other direction varies the flow of current in another of said circuits, and means whereby variations of current flow in said circuits actuate said follow-up element in the respective directions to follow the sensitive element.

7. In a follow-up system for gyro-compasses and the like, the combination with the sensitive and follow-up elements, of a frictionless, non-contacting, non-torque applying linkage between said elements including an oscillatory electric circuit, a thermionic valve in said circuit, means brought into action by relative movement of said elements for varying the reactance of said circuit, and a reversible motive means actuated by said variations in the circuit for driving the follow-up element in the proper direction to cause it to follow the sensitive element.

8. In a follow-up system for gyro-compasses and the like, the combination with the sensitive and follow-up elements, of a frictionless, non-contacting, non-torque applying linkage between said elements including an oscillatory electric circuit, a thermionic valve in said circuit, means brought into action by relative movement of said elements for varying the reactance of said circuit, a two way relay actuated by such variations in one direction or the other, and reversible motive means actuated thereby and connected to said follow-up element whereby said element hunts about its position of coincidence with the sensitive element.

9. In a follow-up system for gyro-compasses and the like, an oscillatory thermionic valve circuit, means brought into action by relative movement of the sensitive and follow-up elements for disturbing the tuning of said circuit and varying the current in the plate circuit, a follow-up motor having opposed field windings, and amplifying means controlled from said plate circuit for passing sufficient current through one winding or the other to drive the motor in the proper direction to cause the follow-up element to follow the sensitive element.

In testimony whereof I have affixed my signature.

HARCOURT C. DRAKE.